US012043256B2

(12) United States Patent
Zarringhalam et al.

(10) Patent No.: US 12,043,256 B2
(45) Date of Patent: Jul. 23, 2024

(54) SYSTEMS AND METHODS FOR DETECTION AND MITIGATION OF CROSSWIND EFFECTS

(71) Applicant: GM GLOBAL TECHNOLOGY OPERATIONS LLC, Detroit, MI (US)

(72) Inventors: Reza Zarringhalam, Whitby (CA); Mohammadali Shahriari, Markham (CA); Klaus Tranbaek, Ein Vered (IL); Ashraf Abualfellat, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 17/805,762

(22) Filed: Jun. 7, 2022

(65) Prior Publication Data

US 2023/0391324 A1    Dec. 7, 2023

(51) Int. Cl.
*B60W 30/12*    (2020.01)
*B60W 10/20*    (2006.01)
*B60W 40/02*    (2006.01)
*B60W 50/00*    (2006.01)

(52) U.S. Cl.
CPC ............ *B60W 30/12* (2013.01); *B60W 10/20* (2013.01); *B60W 40/02* (2013.01); *B60W 50/0098* (2013.01); *B60W 2050/0011* (2013.01); *B60W 2050/0012* (2013.01); *B60W 2520/125* (2013.01); *B60W 2520/14* (2013.01); *B60W 2540/18* (2013.01); *B60W 2555/20* (2020.02)

(58) Field of Classification Search
CPC ....... B60W 10/20; B60W 30/12; B60W 40/02
See application file for complete search history.

(56) References Cited

U.S. PATENT DOCUMENTS

| | | | |
|---|---|---|---|
| 2014/0005892 A1* | 1/2014 | Bar | B60W 30/12 701/41 |
| 2016/0297478 A1* | 10/2016 | Inoue | B60W 10/184 |
| 2018/0281849 A1* | 10/2018 | Irie | B62B 6/008 |
| 2022/0242481 A1* | 8/2022 | Mizoguchi | B62D 15/025 |
| 2022/0266852 A1* | 8/2022 | Khayyer | B60W 40/08 |

* cited by examiner

*Primary Examiner* — Long T Tran
(74) *Attorney, Agent, or Firm* — Lorenz & Kopf, LLP (57) ABSTRACT

Systems and methods for controlling a vehicle are provided. The systems and methods provide a vehicle dynamics model that relates at least one input vehicle dynamics variable to at least one output vehicle dynamics variable. The systems and methods detect a crosswind impacting the vehicle by detecting a disturbance associated with the vehicle dynamics model caused by the crosswind and adapt control of the vehicle based on the detecting the crosswind impacting the vehicle.

16 Claims, 9 Drawing Sheets

SYSTEMS AND METHODS FOR DETECTION AND MITIGATION OF CROSSWIND EFFECTS

The present disclosure generally relates to vehicles, systems and methods having automated lateral control features.

Strong crosswinds can lead to a lateral drift of a vehicle from a straight driving course. Such crosswinds can particularly occur on exposed routes, on bridges and during takeover maneuvers. High profile vehicles may be particularly susceptible to adverse effects of crosswinds.

Some vehicles have an Advanced Driver Assistance System including a lane keeping assistance feature for centering a vehicle in a lane. Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle. In such vehicles, a strong crosswind may offset a lateral position of the vehicle as compared to a commanded trajectory and may induce instability in the vehicle.

It is desirable to provide systems and methods that provide a low hardware solution to detecting crosswind and provide an effective way to mitigate disturbance in a lateral position of the vehicle induced by the crosswind. Furthermore, other desirable features and characteristics of the present invention will become apparent from the subsequent detailed description and the appended claims, taken in conjunction with the accompanying drawings and the foregoing technical field and background.

SUMMARY

In one aspect, a method of controlling a vehicle is provided, the method includes providing, via at least one processor, a vehicle dynamics model that relates at least one input vehicle dynamics variable to at least one output vehicle dynamics variable, detecting, via the at least one processor, a crosswind impacting the vehicle by detecting a disturbance associated with the vehicle dynamics model caused by the crosswind, and adapting, via the at least one processor, control of the vehicle based on the detecting the crosswind impacting the vehicle.

In embodiments, the method includes measuring, using a sensor system of the vehicle, values for the at least one input vehicle dynamics variable and the at least one output vehicle dynamics variable, identifying, via the at least one processor, the vehicle dynamics model using the measured values, providing, via the at least one processor, a nominal vehicle dynamics model, and detecting, via the at least one processor, the crosswind impacting the vehicle by assessing an aspect of the identified vehicle dynamics model with respect to the nominal vehicle dynamics model.

In embodiments, the aspect of the identified vehicle dynamics model with respect to the nominal vehicle dynamics model includes a frequency response.

In embodiments, the method includes deriving, via the at least one processor, at least one of magnitude and phase shift from a first frequency response of the nominal vehicle dynamics model and from a second frequency response of the identified vehicle dynamics model and comparing the derived at least one of magnitude and phase shift from the first frequency response of the nominal vehicle dynamics model and from the second frequency response of the identified vehicle dynamics model to detect the crosswind impacting the vehicle.

In embodiments, adapting control of the vehicle based on the detecting the crosswind impacting the vehicle includes adapting steering control. In an embodiment, adapting control of the vehicle based on the detecting the crosswind impacting the vehicle includes adapting steering control by gain scheduling.

In embodiments, the vehicle dynamics model relates at least steering wheel angle to at least yaw rate or lateral acceleration.

In embodiments, the method includes measuring, with a sensor system, a first value of the at least one output vehicle dynamics variable, predicting, via at least one processor, a second value of the at least one output vehicle dynamics variable using the vehicle dynamics model, and detecting the crosswind impacting the vehicle using the first and second values. In an embodiment, the method includes deriving, via the at least one processor, a phase shift using the first and second values and detecting the crosswind impacting the vehicle based on the phase shift.

In embodiments, adapting control of the vehicle based on the detecting the crosswind impacting the vehicle includes adapting lane centering control.

In another aspect, a vehicle is provided. The vehicle includes: an Advanced Driver Assistance System (ADAS); at least one processor in operable communication with the ADAS, wherein the at least one processor is configured to execute program instructions, wherein the program instructions are configured to cause the at least one processor to: provide a vehicle dynamics model that relates at least one input vehicle dynamics variable to at least one output vehicle dynamics variable; detect a crosswind impacting the vehicle by detecting a disturbance associated with the vehicle dynamics model caused by the crosswind; and adapt control of the vehicle, via the ADAS in response to detecting the crosswind impacting the vehicle.

In embodiments, the program instructions are configured to cause the at least one processor to: measure, using a sensor system of the vehicle, values for the at least one input vehicle dynamics variable and the at least one output vehicle dynamics variable; identify the vehicle dynamics model using the measured values; provide a nominal vehicle dynamics model; detect the crosswind impacting the vehicle by assessing an aspect of the identified vehicle dynamics model with respect to the nominal vehicle dynamics model.

In embodiments, the aspect of the identified vehicle dynamics model with respect to the nominal vehicle dynamics model includes a frequency response.

In embodiments, the program instructions are configured to cause the at least one processor to: derive at least one of magnitude and phase shift from a first frequency response of the nominal vehicle dynamics model and from a second frequency response of the identified vehicle dynamics model and comparing the derived at least one of magnitude and phase shift from the first frequency response of the nominal vehicle dynamics model and from the second frequency response of the identified vehicle dynamics model to detect the crosswind impacting the vehicle.

In embodiments, adapting control of the vehicle in response to detecting the crosswind impacting the vehicle includes adapting steering control.

In embodiments, adapting control of the vehicle in response to detecting the crosswind impacting the vehicle includes adapting steering control by gain scheduling.

In embodiments, the vehicle dynamics model relates at least steering wheel angle to at least yaw rate or lateral acceleration.

In embodiments, the program instructions are configured to cause the at least one processor to: measure, with a sensor system, a first value of the at least one output vehicle dynamics variable; predict a second value of the at least one output vehicle dynamics variable using the vehicle dynamics model; and detect the crosswind impacting the vehicle using the first and second values. In an embodiment, the method includes deriving, via the at least one processor, a phase shift using the first and second values and detecting the crosswind impacting the vehicle based on the phase shift.

In embodiments, adapting control of the vehicle based on the detecting the crosswind impacting the vehicle includes adapting lane centering control.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein effectively detect crosswind on a vehicle and adapts lane following control (for example) to be robust to any oscillation induced by crosswind. The systems and methods may operate based on an active safety sensor suite without additional hardware. In some embodiments, Vehicle dynamics and Advanced Driver Assistance System (ADAS) sensor information are processed together with online frequency correlation analysis, online model identification and real-time phase shift classification to detect and quantify the effects of side wind. The disclosed systems and methods also adapt the vehicle controls to effectively resist the crosswind impact. One vehicle control adaptation is executed by adjusting a steering control feedback and feedforward gains to compensate for the effects of crosswind. This systems and methods enhance a lane centering performance robustness, especially for high profile vehicles and trailering applications.

Accordingly, systems and methods described herein detect noticeable crosswind. A control strategy is disclosed with robustness against oscillations induced by crosswind. A mathematical approach is provided to systematically quantify wind impact on controls. A method of controls adaptation is disclosed to effectively resist the crosswind impact. Further, the crosswind can be detected, quantified and compensated with no additional sensors. Further, the systems and methods rewind the vehicle controls adaptation to a no wind condition in the absence of crosswind detection.

Some systems and methods described herein detect the crosswind by monitoring frequency characteristics of vehicle dynamics states and generate automated steering control commands. The methods and systems may quantify magnitude and phase impacts of the crosswind using online frequency correlation analysis, online model identification and real-time phase shift classification. The systems and methods may dynamically adapt to the magnitude and phase of the crosswind by adjusting the control strategy in real time. The systems and methods may adapt a lane following control to be robust to drift or oscillation induced by crosswind. The vehicular controls may be adapted by generating explicit feedback and feed-forward commands to resist the impact of crosswind.

In embodiments, crosswind impact identification is performed in the frequency domain to detect crosswind. A vehicle model may be identified online with crosswind for frequency analysis. In some embodiments, hand wheel angle control gain scheduling is utilized for crosswind mitigation in the vehicle control.

Figure 1:
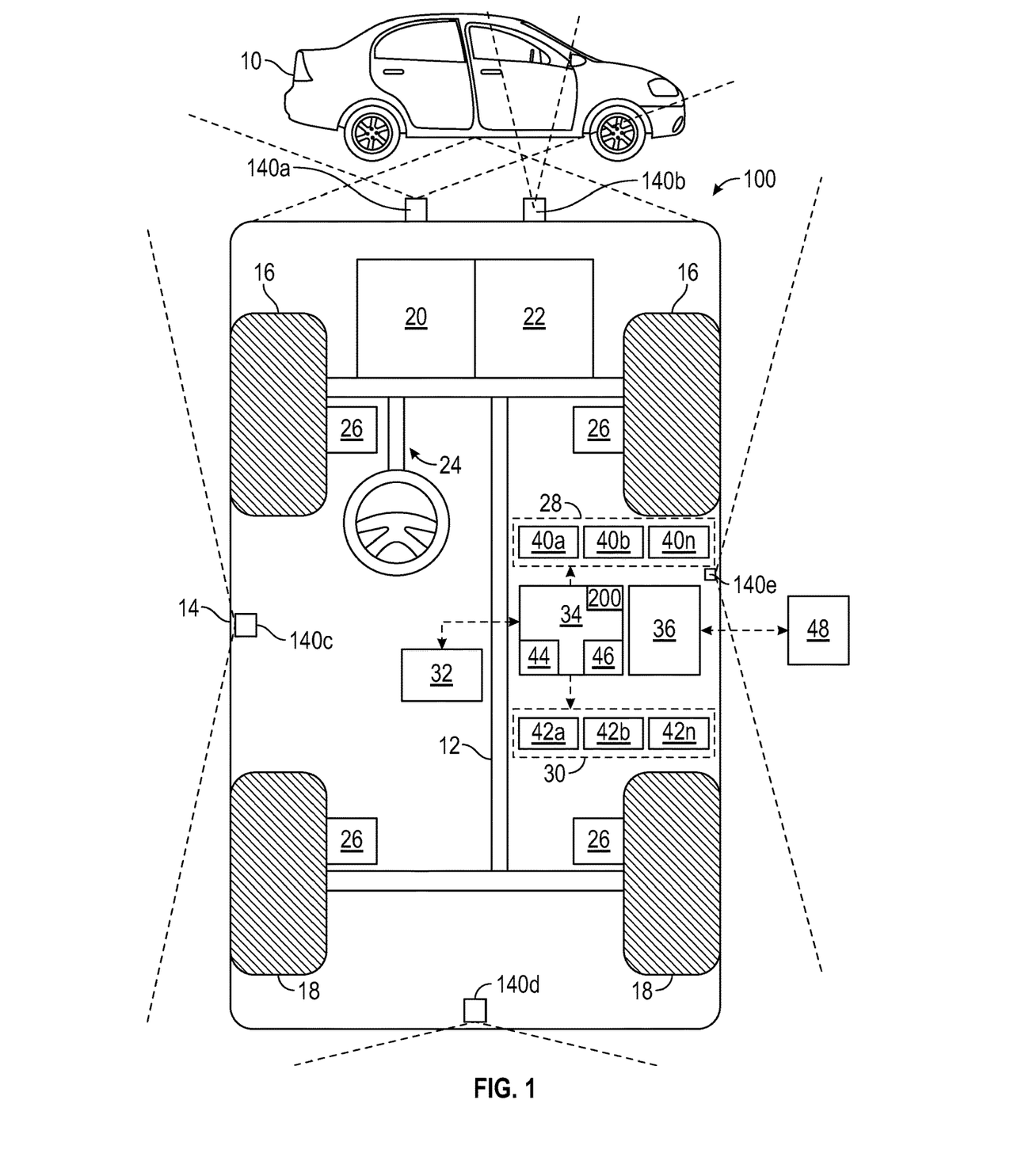
FIG. 1 is a functional block diagram illustrating an autonomous or semi-autonomous vehicle system utilizing a crosswind detection and mitigation system, in accordance with various embodiments.

With reference to FIG. 1, a vehicle system shown generally at 100 is associated with a vehicle 10 in accordance with various embodiments. In general, the vehicle system 100 includes a crosswind detection and mitigation system 200. The crosswind detection and mitigation system 200 detects crosswind using values from vehicle dynamics sensors, resolves a vehicle model and adapts an automated steering control function to mitigate for effects of the detected crosswind.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the crosswind detection and mitigation system 200 is incorporated into the autonomous vehicle 10 (hereinafter referred to as the autonomous vehicle 10). The present description concentrates on an exemplary application in autonomous vehicle applications. It should be understood, however, that the crosswind detection and mitigation system 200 described herein is envisaged to be used in semi-autonomous automotive vehicles. In particular, the crosswind detection and mitigation system 200 has utility in association with driver assistance systems such as adaptive cruise control, collision avoidance systems, lane keeping systems, etc.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. The vehicle 10 may be a high profile vehicle such as pickup trucks, semi-trucks, container vehicles, large SUVs, etc. The vehicle 10 may be connected to a trailer. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, the vehicle 10 may also be characterized as being lower level automation such as a vehicle having a lane keeping system that automatically controls steering, propulsion and/or braking to keep a vehicle in a center of a road lane in response to perception data from a perception system and the detected crosswind.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there is a front facing optical camera 140a. In other embodiments, first and second front facing optical cameras are arranged for respectively imaging a wide angle, near field of view and a narrow angle, far field of view. Further illustrated are left-side and right-side cameras 140c, 140e and a rear camera 140d, which are optional features of the vehicle 10. The number and position of the various cameras 140a-140n is merely exemplary and other arrangements are contemplated. The camera 140a is a device capable of translating visual inputs in the form of light, infrared, or other electro-magnetic (EM) radiation into a data format readily capable of analysis, e.g., a digital, pixelated image. In one embodiment, the camera 140a uses a charge coupled device (CCD) sensor to generate images indicating a field-of-view. Preferably, the camera 140a is configured for continuous image generation, e.g., 30 images generated per second. Images generated by the camera 140a may be stored in memory within the camera or transferred to the controller 34 for storage and/or analysis. Preferably, each image generated by the camera 140a is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model. The optical cameras 140a to 140n may be part of a computer vision system 74 (see FIG. 2) that is able to identify a lane in which the vehicle is travelling and the vehicle 10 is able to plan a central path for the vehicle 10 with respect to that lane and adapt control of the vehicle 10 to follow the central path accurately even in the presence of detected crosswind.

The sensor system 28 includes sensors that provide sensed vehicle dynamics data including yaw rate, lateral acceleration, longitudinal velocity, driver applied torque and steering wheel angle. The longitudinal velocity may be derived from output from a vehicle speed sensor associated with a transmission, axle or wheel of the vehicle 10. Yaw rate and lateral acceleration can be derived from an Inertial Measurement Unit (IMU) included in the sensor system 28. Driver applied torque and steering wheel angle can be derived from torque and steering angle sensors associated with a steering wheel or steering column of the vehicle 10.

Further illustrated is a front facing radar device 44. Although only one front facing radar device is shown in the exemplary embodiment, first and second front facing radar devices may be provided that are respectively long and short range radars. Further radar devices may be included that are distributed around the vehicle. The radar device 44 may be specifically configured for providing an input to driver assistance systems, such as adaptive cruise control and collision warning and thus is a long range radar device. The radar device 44 may be capable of detecting and recognizing objects at a range of up to 250 meters. The radar device 44 is suitable for providing radio frequency signals that can be used to determine a distance and/or a relative velocity of various objects with respect to the vehicle 10. The radar device 44 includes a transmitter and a receiver or a MIMO (multi-input, multi-output) radar device 44 is provided that includes an array of transmitters and an array of receivers. The radar device 44 is controlled to generate a radio frequency wave front, which may be a linear frequency-modulated continuous wave (LFM-CW), often referred to as a chirp signal. Alternately, a pulsed signal or a combination of pulsed and chirp signals are generated. The radio frequency signal is reflected off of various objects in the environment of the vehicle 10. Each of these objects generates a reflected signal in response to receiving the transmitted signal. The radar device 44 includes a processor (not shown) for transferring the reflected waves into a data format capable of analysis, indicating for example range and angle from the objects off which the waves reflected. Further processing allows velocity and position of reflecting surfaces to be revealed.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defines maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 43 and a computer readable storage device or media 46. The processor 43 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 43 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10 or ADAS features of the vehicle 10.

The instructions may include one or more separate programs, each of which comprises an ordered listing of executable instructions for implementing logical functions. The instructions, when executed by the processor 43, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10 or ADAS features of the vehicle 10.

In various embodiments, one or more instructions of the controller 34 are embodied in the crosswind detection and mitigation system 200 and, when executed by the processor 43, are configured to implement the methods and systems described herein for detecting crosswind based on measurements of vehicle dynamics variables and a vehicle model and determining steering control adaptations to mitigate effects of the detected crosswind on the vehicle 10.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10 or vehicle with ADAS features, particularly automated lane centering or lane keeping. To this end, a vehicle can be modified, enhanced, or otherwise supplemented to provide the additional features described in more detail below. The subject matter described herein concerning the crosswind detection and mitigation system 200 is not just applicable to autonomous driving applications, but also other driving systems having one or more automated features utilizing object detection to control an active safety feature based on perception inputs.

Figure 2:
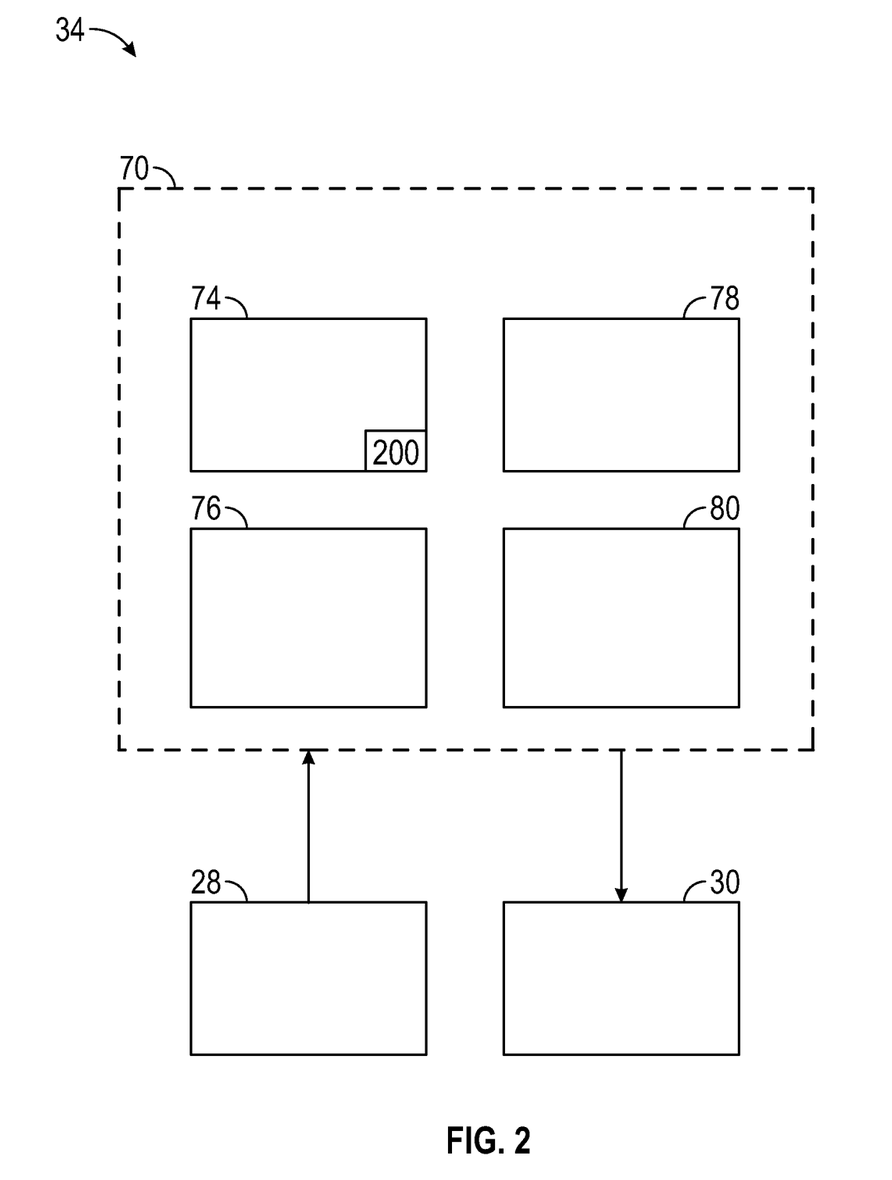
FIG. 2 is a diagram illustrating an autonomous driving system that includes a crosswind detection and mitigation system, in accordance with various embodiments.

In accordance with an exemplary driving application, the controller 34 implements an Advanced Driver Assistance System (ADAS) 70 as shown in FIG. 2. That is, suitable software and/or hardware components of the controller 34 (e.g., the processor 43 and the computer-readable storage device 46) are utilized to provide ADAS 70 that is used in conjunction with vehicle 10.

In various embodiments, the instructions of the ADAS 70 may be organized by function, module, or system. For example, as shown in FIG. 2, the ADAS 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. Further, the computer vision system 74 may detect and locate lane markings in the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The path may be generated so as to follow a center of a lane according to a lane keeping system. The vehicle control system 80 generates control signals for controlling the vehicle 10 according to the determined path. In some embodiments, the vehicle control system 80 is adapted based on detected crosswind. The adaptations may include gain scheduling whereby gains of a feedback algorithm for tracking an error between a commanded path and a followed path are adjusted when crosswind is detected to provide for tighter control. In some embodiments, the gain scheduling is adjusted for a tracking error between a commanded steering wheel angle or driver applied torque and a measured steering wheel angle or driver applied torque so as to more vigorously follow the command. In further or alternative embodiments, gain scheduling is applied to a feedforward algorithm of the vehicle control system 80. The positioning system 76 may process a variety of types of raw localization data in determining a location of the vehicle including Inertial Measurement Unit data, Global Positioning System (GPS) data, Real-Time Kinematic (RTK) correction data, cellular and other wireless data (e.g. 4G, 5G, V2X, etc.), etc.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
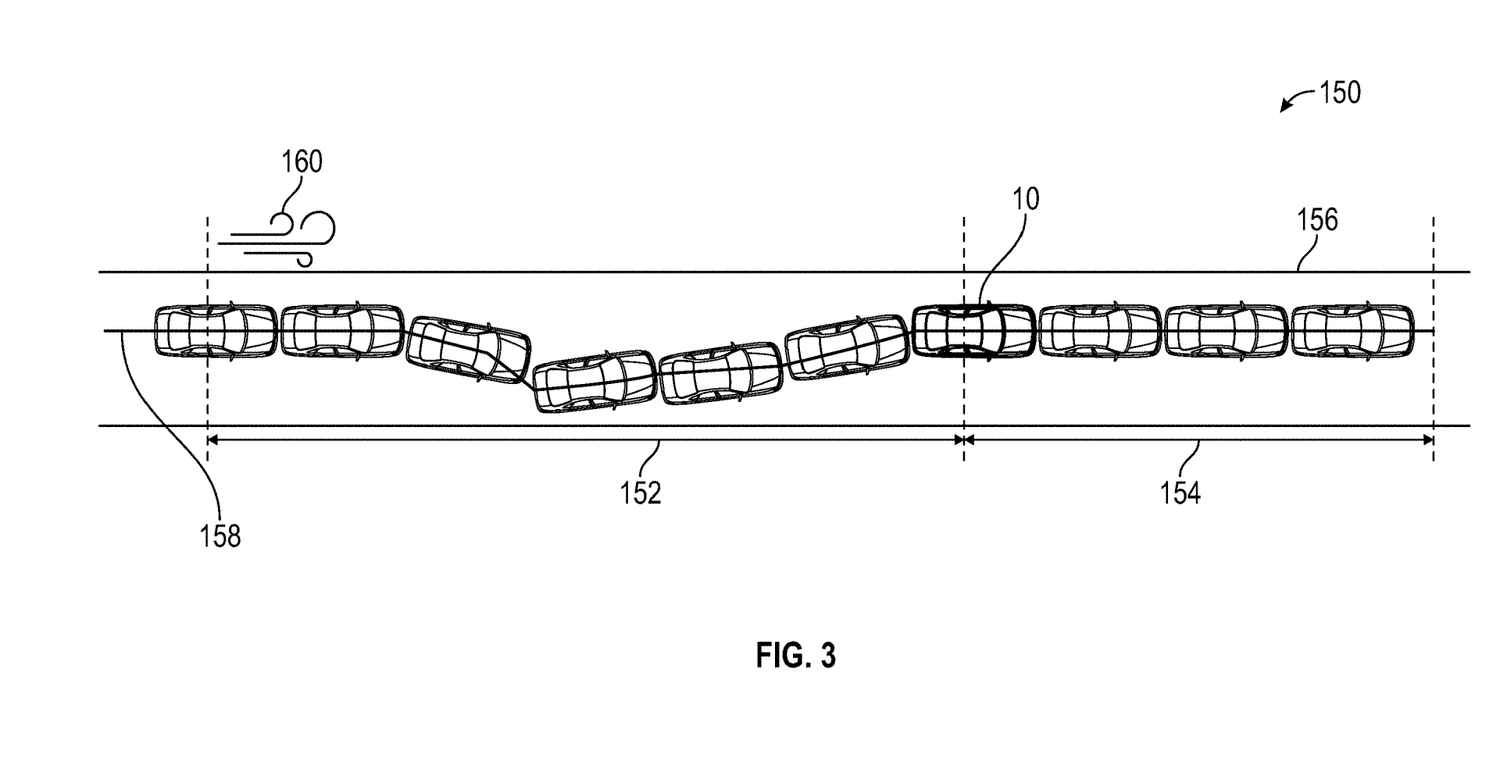
FIG. 3 is a schematic illustration of crosswind impact on a vehicle and detection and mitigation thereof, in accordance with various embodiments.

As mentioned briefly above, the crosswind detection and mitigation system 200 of FIG. 1, and with reference to FIG. 3, is included within the ADAS 70, for example in operable communication with the computer vision system 74, the positioning system 76, the guidance system 78 and the vehicle control system 80. Referring to FIG. 3, a crosswind detection and mitigation overview 150 illustrating functionality of the crosswind detection and mitigation system 200 is illustrated, in accordance with an embodiment. The vehicle 10 is subject to a crosswind 160, which induces some oscillation or disturbance in a vehicle track 158 representing a path of travel of the vehicle 10. The ADAS 70 is attempting to follow a central path along the vehicle lane 156 by detecting lane lines using the computer vision system 74 and controlling the vehicle 10 to follow a central path as defined by the guidance system 78. However, the crosswind 160 has introduced some variability in that path. The crosswind detection and mitigation system 200 uses measurements of vehicle dynamics variables provided by the sensor system 28 to detect the disturbance introduced into the vehicle 10 and activates a vehicle motion control adaptation 154 in response to the crosswind detection to provide a more stable lateral control of the vehicle 10.

Figure 4:
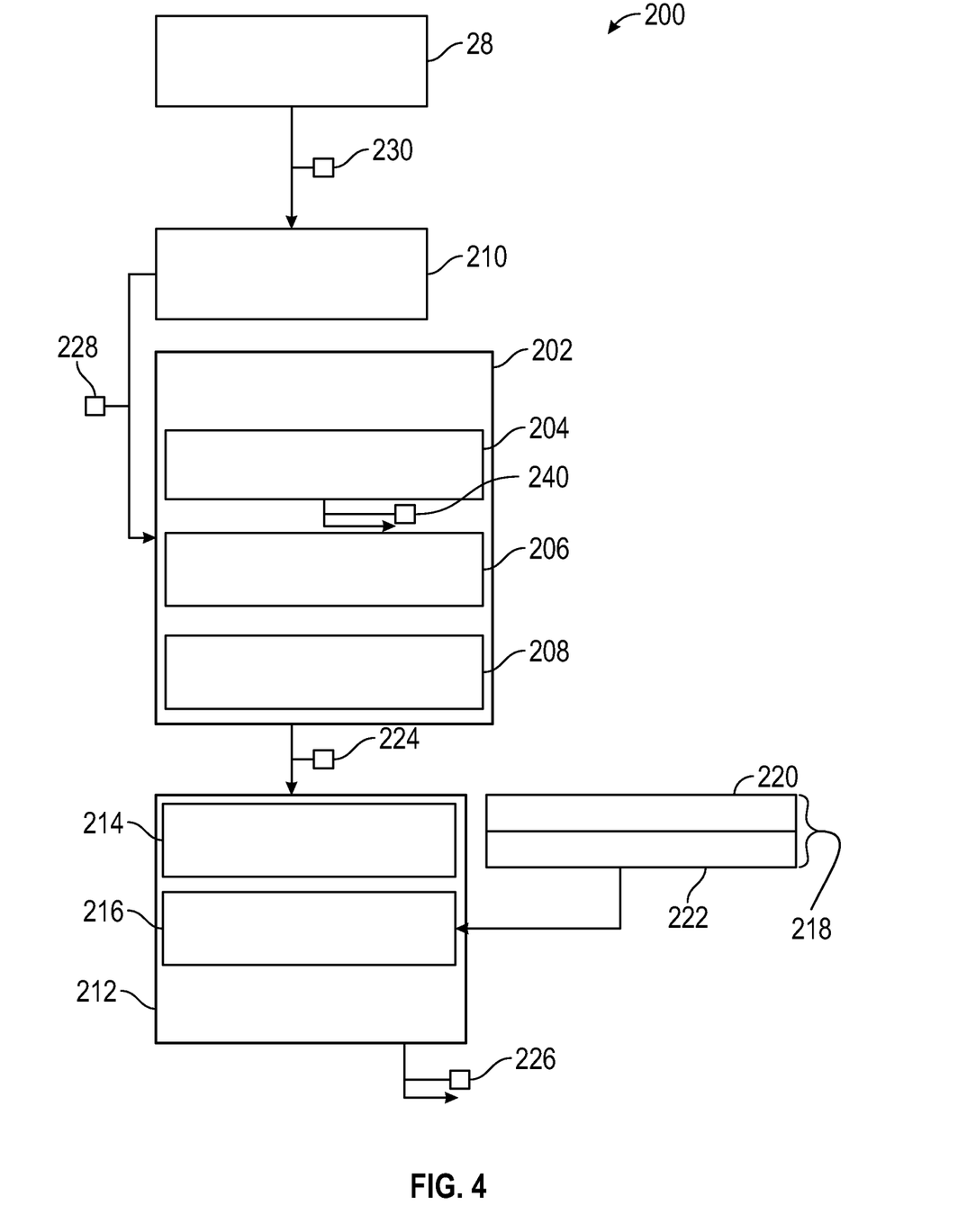
FIG. 4 is a functional block diagram of a crosswind detection and mitigation system, in accordance with various embodiments.

Referring to FIG. 4, with continued reference to FIGS. 1 to 3, the crosswind detection and mitigation system 200 is further illustrated in accordance with exemplary embodiments. The crosswind detection and mitigation system 200 includes functional modules that are performed by the programming instructions described hereinbefore and other system components. The crosswind detection and mitigation system 200 of FIG. 4 includes a crosswind detection module 202 and a vehicle motion control module 212. In some embodiments, the crosswind detection and mitigation system 200 includes a nominal model identification module 210, although this module may not be present in other embodiments.

The crosswind detection module 202 receives vehicle dynamics measurements 230 from the sensor system 28 and detects the crosswind based thereon. Various methods of detecting crosswind using these vehicle dynamics measurements 230 may be implemented as described further herein. In general, the vehicle dynamics measurements 230 are compared to expectations according to a vehicle dynamics model and differences are detected that can be attributed to crosswind. In particular, steering wheel angle, steering torque, lateral acceleration, yaw rate and other lateral vehicle dynamics parameters that may be affected by crosswind may be assessed as compared to expectations for them according to a vehicle dynamics model. A phase shift or frequency response of the vehicle dynamics variables from expected values to measured values may be assessed in detecting crosswind. In the exemplary embodiment of FIG. 4, the vehicle dynamics model is identified by the crosswind detection module 202 when the vehicle is being driven and the real-time or online identified model 240 is compared to a offline or nominal model 228. In such an embodiment, the online identified model 240 is representative of measured vehicle dynamics variables and the nominal model 228 is representative of the corresponding expected vehicle dynamics variables. The online identified model 240 may include disturbances as compared to the nominal model 228 that are characteristic of crosswind conditions and these disturbances are detectable. The crosswind detection module 202 may assess a frequency response of the nominal model 228 as compared to that of the online identified model 240 to detect frequency disturbances caused by crosswind. The crosswind detection module 202 may assess, additionally, or alternatively, a phase shift between the nominal model 228 and the online identified model 240 to detect the crosswind.

The nominal model identification module 210 may be identified offline (e.g. during testing or production or even during known zero crosswind conditions) to provide the nominal model 228. A variety of vehicle dynamics models are known in the art that could be used as the vehicle dynamics model including a two-degree-of-freedom bicycle model, representing the lateral and yaw motions of the vehicle, a three degree of freedom model, which further introduces longitudinal acceleration and higher degrees of freedom models. The model used as the foundation for the nominal model 228 may relate steering wheel angle as input to yaw rate or lateral acceleration as an output (or both). Model identification is a process of estimating or best-fitting parameters of the model to the measured data, i.e. the vehicle dynamics measurements 230. A corresponding model to the nominal model 228 is used in the crosswind detection module 202 and an online model identification process is performed that receives and best-fits vehicle dynamics measurements 230 during use of the vehicle 10 when the vehicle could potentially be subject to crosswind. The identified parameters will implicitly include the effects of any crosswind therein such that a comparison of the nominal model 228 and the online identified model 240 can reveal any crosswind impact.

The crosswind detection module 202 may perform a frequency response cross correlation check (which is performed by the frequency response correlation sub-module 206) and/or a phase shift classification (which is performed by the phase shift classification sub-module 208) using the nominal model 228 and the online identified model 240 as part of the model comparisons. In one embodiment, the frequency response correlation check may convert the nominal model 228 and the online identified model 240 into the frequency domain (e.g. using a Fourier transform) and determine a magnitude of difference between the models across a frequency sweep, where the frequency sweep extends across a known range of frequencies that can strongly indicate effects of crosswind. In another embodiment, the frequency response correlation check subtracts the nominal model 228 from the online identified model 240 (or vice versa) and determines a norm of the difference at different frequencies along a frequency sweep. In another embodiment, a cross correlation function is applied to the nominal model 228 and the online identified model 240 to compare the models and the result is compared across a frequency sweep. A phase shift in frequency response between the nominal model 228 and the online identified model 240 has been found to be indicative of the effects of crosswind. For the phase shift classification, a phase shift in the output from the nominal model 228 for an input at a frequency of interest and the output from the online identified model 240 for an input at the frequency is determined for one or more frequencies. However the phase shift and/or magnitude of the frequency response is determined, these values can be compared to a threshold (or a respective threshold at each frequency of an input signal) to detect the crosswind. A plurality of thresholds may be used to classify different magnitudes of crosswind in that greater phase shifts or magnitude of the frequency response from the nominal model 228 to the online identified model 240 indicate a greater disturbance induced by the crosswind. The crosswind detection module 202 thus outputs a crosswind detection result 224 indicative of whether crosswind has been detected or not and may also provide an indication of strength of the crosswind.

The vehicle motion control module 212 receives the crosswind detection result 224 and adapts control of the vehicle motion responsively to mitigate effects of crosswind on the vehicle 10. In embodiments, the vehicle motion control module 212 is an ADAS controller such as a lane keeping system. The vehicle motion control module 212 may include a steering control adaptation sub-module 214 that adapts steering control responsively to the crosswind detection result 224. In one embodiment, one or more gain parameters of a control algorithm is adapted to follow the command steering control more tightly or loosely. The control algorithm may track an error between a commanded steering control value and a measured steering control value. Gain scheduling may be applied to feedforward and/or feedback algorithm of the control algorithm responsively to the crosswind detection result 224. The gain scheduling may be applied in a single step if the crosswind detection result 224 indicates a Boolean value for the crosswind detection result (e.g. crosswind detected or not detected states) or in multiple steps if the crosswind detection result 224 indicates more than two steps representing a plurality magnitudes of crosswind or in a proportional fashion if the crosswind detection result 224 is continuously varying. The commanded steering control value may be steering torque or steering wheel angle. The vehicle motion control module 212 outputs vehicle motion control commands 226 according to the adapted steering control algorithm. The vehicle motion control module 212 further includes an adaption removal sub-module 216 that is responsive to the crosswind detection result 224 indicating no crosswind (or insufficient crosswind) to remove or reduce the adaptation. The vehicle motion control module receives other adaptation removal factors 218 than the crosswind detection result 224 indicating absence of sufficient crosswind. The other adaptation removal factors 218 can include an end of a maturation time (e.g. a maximum amount of time after which the control algorithm adaptation is removed) or detection of greater than a threshold amount of road curvature (e.g. through the computer vision system 74, the position of the vehicle 10 relative to a map and/or measurements from an IMU of the sensor system 28).

Figure 5:
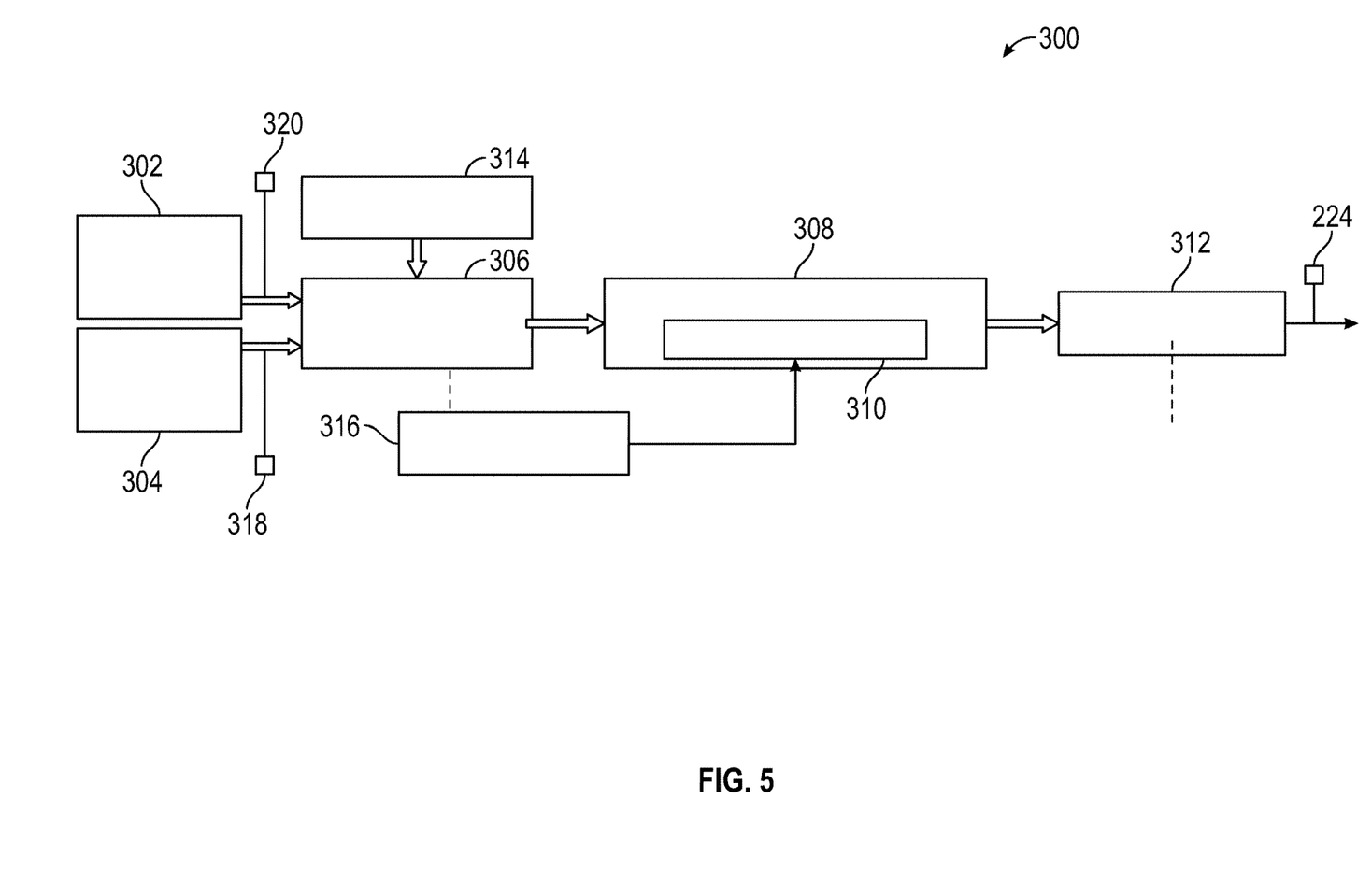
FIG. 5 is a functional block diagram of a first method of crosswind detection, in accordance with various embodiments.

The crosswind detection module 202 can utilize a variety of processes to detect crosswind, as will be discussed with reference to the exemplary embodiments of FIGS. 5, 7 and 8. Referring to FIG. 5, in conjunction with FIG. 4, a first method of crosswind detection 300 is disclosed. At 306, online model identification is performed when the vehicle is potentially subject to crosswind when driving. The online model identification is a process of real-time fitting of vehicle dynamics measurements 230 with a base vehicle dynamics model. In one embodiment, an ordinary differential equation fit is utilized although other fitting processes may be used to establish the parameters for the online identified model 240. In the exemplary embodiment of FIG. 5, the vehicle dynamics measurements 230 include measured steering wheel angle 320 from a steering angle sensor 302 of the sensor system 28 and measured yaw rate 318 from an inertial measurement unit 304 of the sensor system 28. Accordingly, the nominal model 228 and the online identified model 240 relate input steering wheel angle to output yaw rate. The first method of crosswind detection 300 includes a process of comparing the nominal model 228 provided at 316 to the online identified model 240 provided at 306. The comparison may include determining differences in the nominal model 228 and the online identified model 240 or determining differences in variables extracted from the nominal model 228 and the online identified model 240. In the exemplary embodiment of FIG. 5, a frequency analysis is performed at 308 to determine a frequency correlation between the nominal model 228 and the online identified model 240. The frequency correlation may derive a magnitude of frequency response difference across a frequency sweep, where the frequency sweep is selected between minimum and maximum frequency values determined to be of interest for detecting crosswind. An exemplary frequency range is between 1 and 10 Hertz. The magnitude difference in the frequency response may be accumulated over the frequency sweep to provide a total magnitude shift. A phase shift from between the nominal model 228 and the online identified model 240 at one or more frequencies within the frequency sweep may additionally, or alternatively, be determined. Where the phase shift is determined at more than one frequency, the phase shift may be accumulated to provide a total phase shift. At 312, the crosswind is detected using a result of the comparison of the nominal model 228 and the online identified model 240. In particular, any differences between the nominal model 228 and the online identified model 240 that are detectable as a result of crosswind on the vehicle 10 can be included in the comparison result and used for detection of the crosswind at 312. In one embodiment, the phase shift (or total phase shift) and/or the magnitude (or total magnitude) of frequency shift is compared to one or more thresholds that distinguish presence or absence of crosswind and optionally also varying strengths of crosswind. The first method of crosswind detection 300 outputs the crosswind detection result 224 embodying a positive or negative detection result as to crosswind and optionally a varying indication of strength of the crosswind.

In the example of FIG. 5, and with continued reference to FIG. 4, the first method of crosswind detection 300 includes a pre-check at 314 before proceeding with the remaining steps to ensure that there is a minimum excitation being detected. The minimum excitation may compare one or more of the vehicle dynamics measurements 230 to a threshold to ensure that there is sufficient lateral disturbance for robust model identification and crosswind detection.

Figure 7:
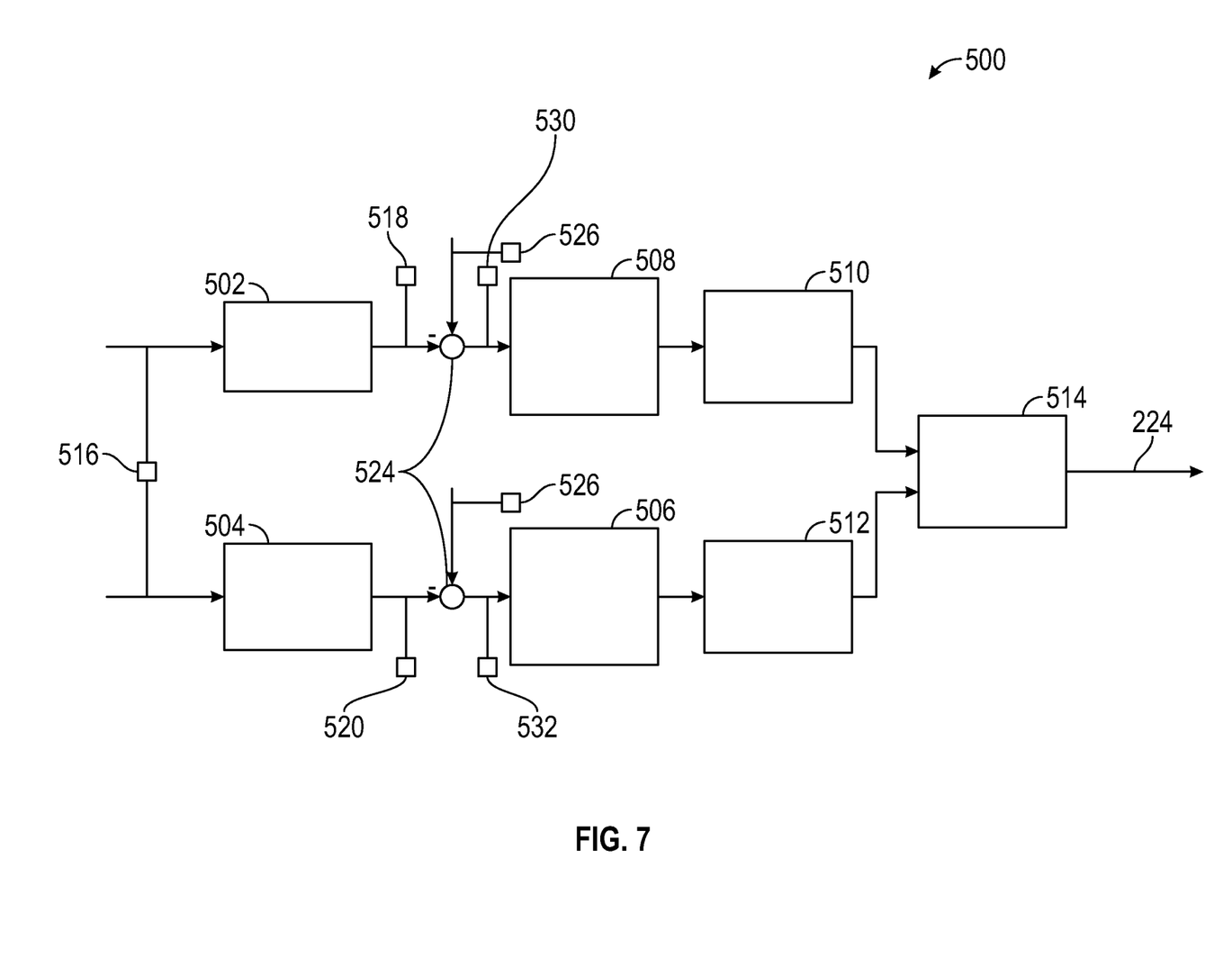
FIG. 7 is a functional block diagram of a second method of crosswind detection, in accordance with various embodiments.

Referring to FIG. 7, and continuing to refer to FIG. 4, a second method of crosswind detection 500 utilizes one or more vehicle dynamics models in a different way to detect a disturbance in measured lateral vehicle dynamics variables as compared to that predicted by the one or more vehicle dynamics models, according to an exemplary embodiment. In FIG. 7, a first vehicle model 502 and a second vehicle model 504 are provided. The first and second vehicle models 502, 504 are different models to provide for robustness in crosswind detection. In one embodiment, the first and second vehicle models 502, 504 relate different input and output vehicle dynamics variables. In another embodiment, the vehicle models 502, 504 are different in terms of the transfer functions used.

In the exemplary embodiment of FIG. 7, the first vehicle model 502 includes a first transfer function between measured steering wheel angle 516 as an input variable and first expected yaw rate 518 as an output variable (as predicted by the first vehicle model 502). The second vehicle model 504 includes a second transfer function between the measured steering wheel angle 516 and the second expected yaw rate 520. The second method of crosswind detection 500 compares the first expected yaw rate 518 and the second expected yaw rate 520 with measured yaw rate 526 to determine if the yaw rate (or other lateral vehicle dynamics parameter) is acting as expected according to the first and second vehicle models 502, 504. The comparison is performed through a difference (or subtraction) operation 524 in the present embodiment to provide a first yaw rate difference 530 and a second yaw rate difference 532. The crosswind may manifest itself in the lateral vehicle dynamics variable in certain frequency ranges. As such, first and second frequency selection filters 506, 508 are applied to the output from the difference operation. The first and second frequency selection filters 506, 508 may be band pass filters tuned to the frequency ranges of interest. In alternatives, a single frequency selection filter could be used and the frequency or frequency selection filters 506, 508 could be positioned upstream of the difference operation 524.

At 510, the frequency range limited first and second yaw rate differences 530, 532 are compared to respective amplitude thresholds selected to distinguish when sufficient crosswind is impacting the vehicle 10 to provoke remedial action. An AND operation 514 is applied to the output of the amplitude threshold comparisons 510, 512 such that when the processing chain from both the first and second vehicle models 502, 504 detect crosswind, then the crosswind detection result 224 is positive. Otherwise, absence of crosswind is indicated in a negative crosswind detection result 224. The crosswind detection result 224 may be a Boolean value, a multi-step value depending on strength of crosswind detection through use of a plurality of amplitude thresholds or a continuously varying value that changes depending on degree of difference between the expected vehicle dynamics variable and that predicted by the first and second vehicle models 502, 504. Conceivably, just one, or more than two, vehicle dynamics models could be provided in other embodiments.

Figure 8:
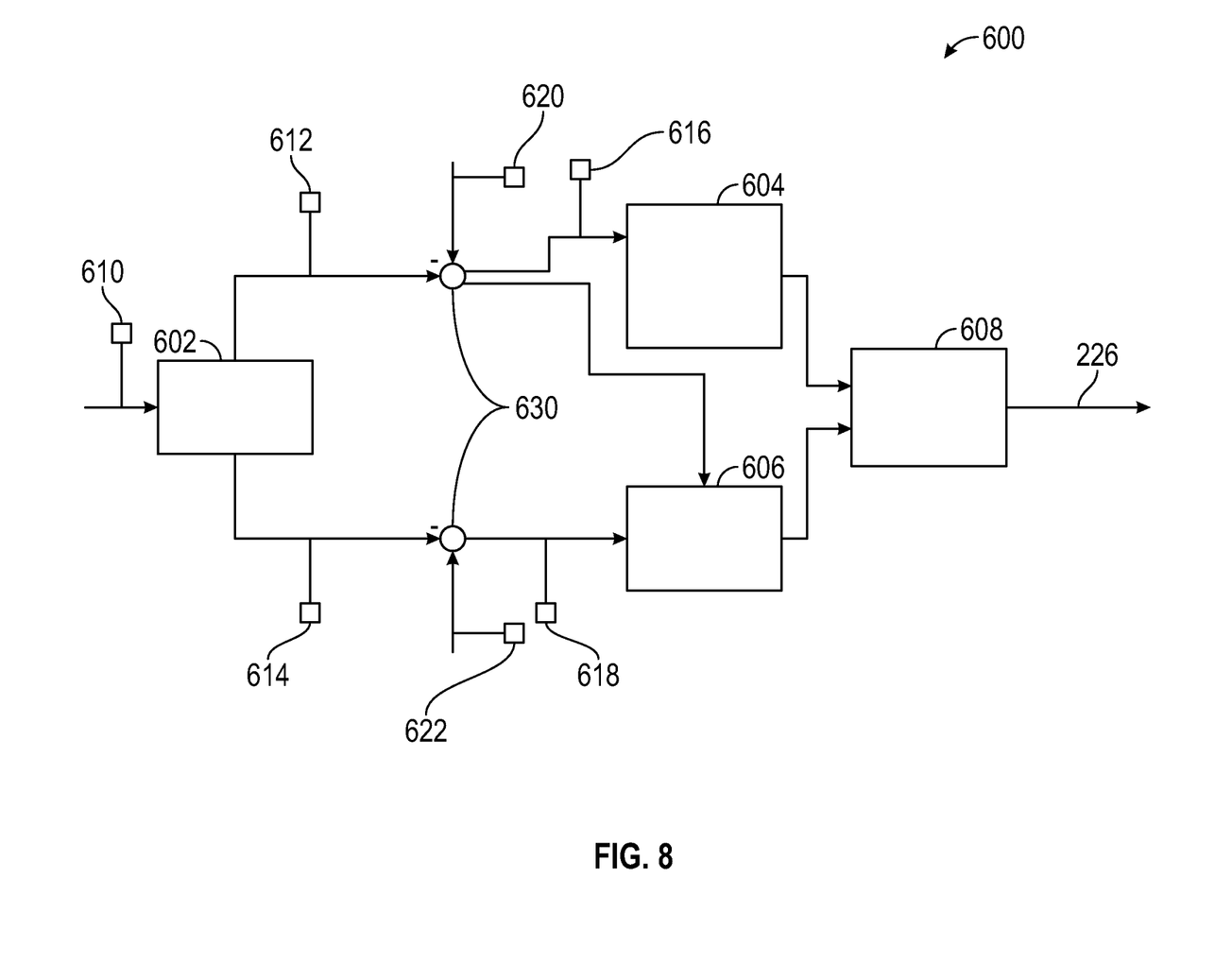
FIG. 8 is a functional block diagram of a third method of crosswind detection, in accordance with various embodiments.

Referring to FIG. 8, and continuing to refer to FIG. 4, a third method of crosswind detection 600 is illustrated according to an exemplary embodiment. The third method of crosswind detection 600 utilizes a vehicle model 602 to predict one or more vehicle dynamics variables, which is compared to corresponding vehicle dynamics measurements 230. When the measured values sufficiently differ from the predicted values, crosswind is detected on the assumption that the shift from the expectation is produced by crosswind impact on the vehicle 10. Further, a phase shift between the measured and expected values is estimated, which has been found to be strongly indicative of crosswind disturbance.

In the exemplary embodiment of FIG. 8, a vehicle model 602 receives a measured steering wheel angle 610 from the sensor system 28 and predicts expected yaw rate 612 and expected lateral acceleration 614. In other embodiments, respective vehicle models generate the expected yaw rate 612 and the expected lateral acceleration 614. The expected yaw rate 612 is compared, at difference operation 630, to measured yaw rate 620 received from the sensor system 28. The resulting yaw rate difference 616 is provided, respectively, for a step of amplitude threshold comparison 604 and a step of phase shift estimation 606. The expected lateral acceleration 614 is compared, at difference operation 630, to measured lateral acceleration 622 received from the sensor system 28. The resulting lateral acceleration difference 618 is provided for a step of phase shift estimation 606. Conceivably, just one of the steps of amplitude threshold comparison 604 and phase shift estimation 606 could be provided for the purpose of crosswind detection. The amplitude threshold comparison 604 determines whether the yaw rate difference 616 is greater than a threshold to indicate that the expected yaw rate 612 is sufficiently different from the measured yaw rate 620 to indicate a possible crosswind disturbance. A plurality of thresholds may be used to provide a multistep indication of different strengths of crosswind. Further, a frequency selection may be incorporated to frequency restrict the comparison to frequency ranges particularly relevant to crosswind detection. The phase shift estimation 606 determines a phase shift in the yaw rate difference 616 and in the lateral acceleration difference 618. The resulting phase shifts may be compared with respective thresholds or accumulated or averaged and compared with a threshold indicative of crosswind disturbance being present in the phase shift signal. In one embodiment, phase shift is determined by performing cross-correlation between first and second sliding windows applied to the yaw rate difference 616 signal and the lateral acceleration difference 618 signal. The third method of crosswind detection 600 includes an AND operation 608 such that the phase shift estimation result and the amplitude threshold comparison must both indicate crosswind disturbance to provide a positive crosswind detection result 224.

In FIGS. 7 and 8, the vehicle models 502, 504, 602 may be offline identified models or online identified models (as discussed with respect to FIG. 4) or a mixture of both.

Figure 6:
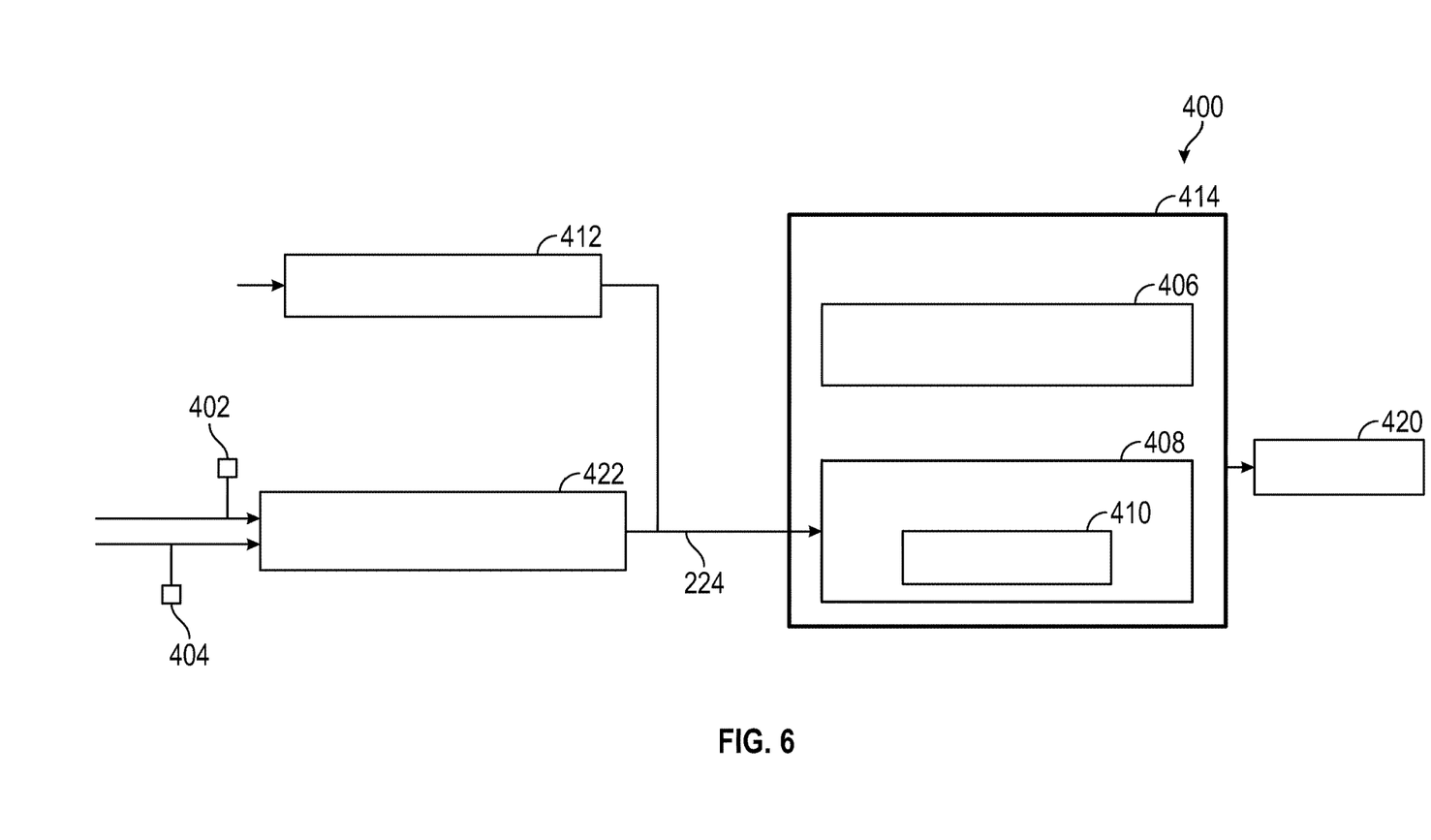
FIG. 6 is a functional block diagram of a method of crosswind mitigation, in accordance with various embodiments.

Referring back to FIG. 4, and with additional reference to FIG. 6, the vehicle motion control module 212 is described in further detail, in accordance with an exemplary embodiment of a method of crosswind mitigation 400 performed by the vehicle motion control module 212. The method of crosswind mitigation includes a stage of crosswind detection 422, which has been described in further detail with respect to the exemplary embodiments of FIGS. 4, 5, 7 and 8. In an embodiment, measurements of a first vehicle dynamics variable 402 and a second vehicle dynamics variable 404 are assessed with respect to a transfer function (or vehicle dynamics model) relating the first vehicle dynamics variable 402 to the second vehicle dynamics variable 404 and an assessment result is compared to an expected relationship or outcome. Crosswind is detected based on that comparison. The first vehicle dynamics variable 402 and the second vehicle dynamics variable 404 can be at least one of yaw rate, lateral acceleration, steering torque and steering angle. The method of crosswind mitigation 400 includes a stage of trajectory control 412 and a stage of steering angle control 414. The trajectory control 412 computes a steering angle required to follow a desired trajectory that has been set by the guidance system 78 (see FIG. 2 and discussion above). In a lane keeping ADAS, the desired trajectory may be aligned with a center of a lane. A stage of steering angle control 414 takes in the desired steering angle to compute a steering torque required to achieve this angle and sends the steering torque to the Electronic Power Steering (EPS) 420, which in turn controls the steering torque to move the wheels 16, 18. The stage of steering angle control 414 includes a feedforward algorithm 406 and a feedback algorithm 408. The feedforward algorithm 406 and the feedback algorithm 408 each determine contributions to steering angle control 414 that are converted to steering torque and sent to the EPS 420. The feedforward algorithm uses a vehicle model to compute a commanded steering torque required to achieve the input desired steering angle. The feedback algorithm receives a tracking error between a measured steering angle or steering torque and the desired steering angle or the commanded steering torque. The tracking error is inserted into a control function including one or more gain parameter. For example, the control function may be a Proportional Integral Derivative (PID) control function with each of the Proportional, Integral and Derivative terms being multiplied by a respective gain parameter.

In embodiments, the steering angle control 414 includes a stage of gain scheduling 410 whereby one or more gain parameters used in the control function of the feedback algorithm 408 are adjusted according to the crosswind detection result 224. In additional or alternative embodiments, gain scheduling is applied to the feedforward algorithm 406. That is, by way of gain parameter adaptation (gain scheduling) the weight of the steering angle or steering torque provided by the feedforward algorithm 406 is reduced as compared to the weight of the steering or steering torque provided by the feedback algorithm 408 in determining the steering torque command for the EPS 420 when crosswind is detected.

Figure 9:
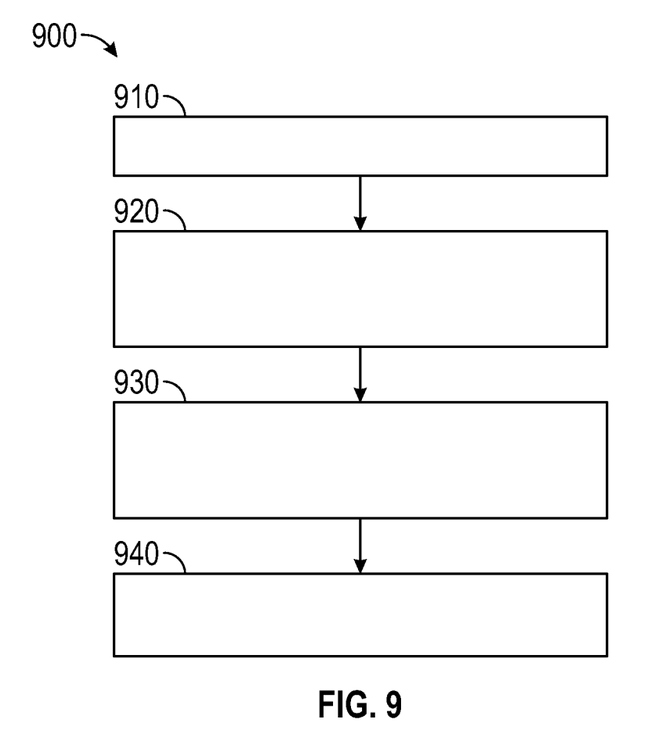
FIG. 9 is a flowchart illustrating method steps of an algorithmic process to detect and mitigate for crosswinds impacting a vehicle, in accordance with various embodiments.

Referring now to FIG. 9, and with continued reference to FIGS. 1-8, a flowchart illustrates a crosswind detection and mitigation method 900, in accordance with the present disclosure. As can be appreciated in light of the disclosure, the order of operation within the method is not limited to the sequential execution as illustrated in FIG. 9, but may be performed in one or more varying orders as applicable and in accordance with the present disclosure. In various embodiments, the method 900 can be scheduled to run based on one or more predetermined events such as detection of minimum excitation (as discussed with respect to step 314 in FIG. 5) and activation of a lane centering ADAS, and/or can run continuously during operation of the autonomous vehicle 10.

In step 910, a vehicle dynamics model is provided. The vehicle dynamics model may be retrieved from the computer readable storage device or media 46. The vehicle dynamics model defines a transfer function between an input vehicle dynamics variable and an output vehicle dynamics variable. The input and output vehicle dynamics variable relate to lateral dynamics of the vehicle 10 and may inherently include information on any crosswind.

In step 920, measurements of vehicle dynamics variables are inserted into the vehicle dynamics model. In one embodiment, this is performed by an online model identification whereby parameters of the model are quantified according to a best-fit of the vehicle dynamics measurements 230. In another embodiment, a measured input vehicle dynamics variable is converted to a predicted vehicle dynamics variable using the transfer function of the vehicle model. The vehicle dynamics measurements may be yaw rate, lateral acceleration, steering angle and/or steering torque.

In step 930, the output from the vehicle dynamics model (i.e. the predicted vehicle dynamics variable) or the vehicle dynamics model itself is compared to expected results to detect any disturbance induced by crosswind. In one embodiment, the predicted vehicle dynamics variable is compared to a corresponding measured value and the difference therebetween is used to detect crosswind. A phase or amplitude or frequency of the difference may be used to detect the crosswind. In another embodiment, the online identified model 240 is compared to a nominal model 228 to detect crosswind. The comparison may include comparing frequency response or phase shift to detect crosswind. More than one vehicle model may be assessed in steps 920, 930. Further, a combination of the techniques disclosed herein for detecting crosswind may be applied.

In step 940, control of the vehicle 10 is adapted when crosswind is detected. The detected crosswind may be provided as a binary value (i.e. either absence or detection of crosswind), as a multi-step value (i.e. absence of crosswind and differing strengths of crosswind) or as a continuously varying value depending on strength of crosswind. The vehicle is controlled so as to mitigate effects of crosswind, e.g. through propulsion, braking and/or steering commands. In one embodiment, gain scheduling is used in a feedback and/or feedforward part of a steering controller in response to the detected crosswind. A magnitude of the gain scheduling or other vehicle control adaptation may be adjusted depending on strength of crosswind detected.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   providing, via at least one processor, a vehicle dynamics model that relates at least one input vehicle dynamics variable to at least one output vehicle dynamics variable;
   measuring, with a sensor system, a first value of the at least one output vehicle dynamics variable;
   predicting, via at least one processor, a second value of the at least one output vehicle dynamics variable using the vehicle dynamics model;
   deriving, via the at least one processor, a phase shift using the first and second values;
   detecting, via the at least one processor, a crosswind impacting the vehicle by detecting a disturbance associated with the vehicle dynamics model caused by the crosswind based on the phase shift; and
   adapting, via the at least one processor, control of the vehicle based on the detecting the crosswind impacting the vehicle.

2. The method of claim 1, comprising:
   measuring, using the sensor system of the vehicle, values for the at least one input vehicle dynamics variable and the at least one output vehicle dynamics variable to provide measured values;
   identifying, via the at least one processor, the vehicle dynamics model using the measured values to provide an identified vehicle dynamics model;
   providing, via the at least one processor, a nominal vehicle dynamics model; and
   detecting, via the at least one processor, the crosswind impacting the vehicle by assessing an aspect of the identified vehicle dynamics model with respect to the nominal vehicle dynamics model.

3. The method of claim 2, wherein the aspect of the identified vehicle dynamics model with respect to the nominal vehicle dynamics model includes a frequency response.

4. The method of claim 3, comprising deriving, via the at least one processor, at least one of magnitude and phase shift from a first frequency response of the nominal vehicle dynamics model and from a second frequency response of the identified vehicle dynamics model and comparing the at least one of magnitude and phase shift from the first frequency response of the nominal vehicle dynamics model and from the second frequency response of the identified vehicle dynamics model to detect the crosswind impacting the vehicle.

5. The method of claim 1, wherein adapting control of the vehicle based on the detecting the crosswind impacting the vehicle includes adapting steering control.

6. The method of claim 5, wherein adapting control of the vehicle based on the detecting the crosswind impacting the vehicle includes adapting the steering control by gain scheduling.

7. The method of claim 1, wherein the vehicle dynamics model relates at least steering wheel angle to at least yaw rate or lateral acceleration.

8. The method of claim 1, wherein adapting control of the vehicle based on the detecting the crosswind impacting the vehicle comprises adapting lane centering control.

9. A vehicle, comprising:
   an Advanced Driver Assistance System (ADAS); and
   at least one processor in operable communication with the ADAS, wherein the at least one processor is configured to execute program instructions, wherein the program instructions are configured to cause the at least one processor to:
   provide a vehicle dynamics model that relates at least one input vehicle dynamics variable to at least one output vehicle dynamics variable;
   measure, with a sensor system, a first value of the at least one output vehicle dynamics variable;
   predict a second value of the at least one output vehicle dynamics variable using the vehicle dynamics model;
   derive a phase shift using the first and second values;
   detect a crosswind impacting the vehicle by detecting a disturbance associated with the vehicle dynamics model caused by the crosswind based on the phase shift; and
   adapt control of the vehicle, via the ADAS in response to detecting the crosswind impacting the vehicle.

10. The vehicle of claim 9, wherein the program instructions are configured to cause the at least one processor to:
    measure, using the sensor system of the vehicle, values for the at least one input vehicle dynamics variable and the at least one output vehicle dynamics variable to provide measured values;
    identify the vehicle dynamics model using the measured values to provide an identified vehicle dynamics model;
    provide a nominal vehicle dynamics model; and
    detect the crosswind impacting the vehicle by assessing an aspect of the identified vehicle dynamics model with respect to the nominal vehicle dynamics model.

11. The vehicle of claim 10, wherein the aspect of the identified vehicle dynamics model with respect to the nominal vehicle dynamics model includes a frequency response.

12. The vehicle of claim 11, wherein the program instructions are configured to cause the at least one processor to: derive at least one of magnitude and phase shift from a first frequency response of the nominal vehicle dynamics model and from a second frequency response of the identified vehicle dynamics model and comparing the at least one of magnitude and phase shift from the first frequency response of the nominal vehicle dynamics model and from the second frequency response of the identified vehicle dynamics model to detect the crosswind impacting the vehicle.

13. The vehicle of claim 9, wherein adapting control of the vehicle in response to detecting the crosswind impacting the vehicle includes adapting steering control.

14. The vehicle of claim 13, wherein adapting control of the vehicle in response to detecting the crosswind impacting the vehicle includes adapting the steering control by gain scheduling.

15. The vehicle of claim 9, wherein the vehicle dynamics model relates at least steering wheel angle to at least yaw rate or lateral acceleration.

16. The vehicle of claim 9, wherein adapting control of the vehicle in response to detecting the crosswind impacting the vehicle comprises adapting lane centering control.

* * * * *